Oct. 30, 1923.
F. M. DAVIS
1,472,052
ELECTROSTEAM RADIATOR
Filed April 17, 1922
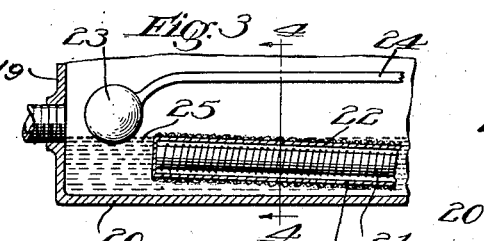
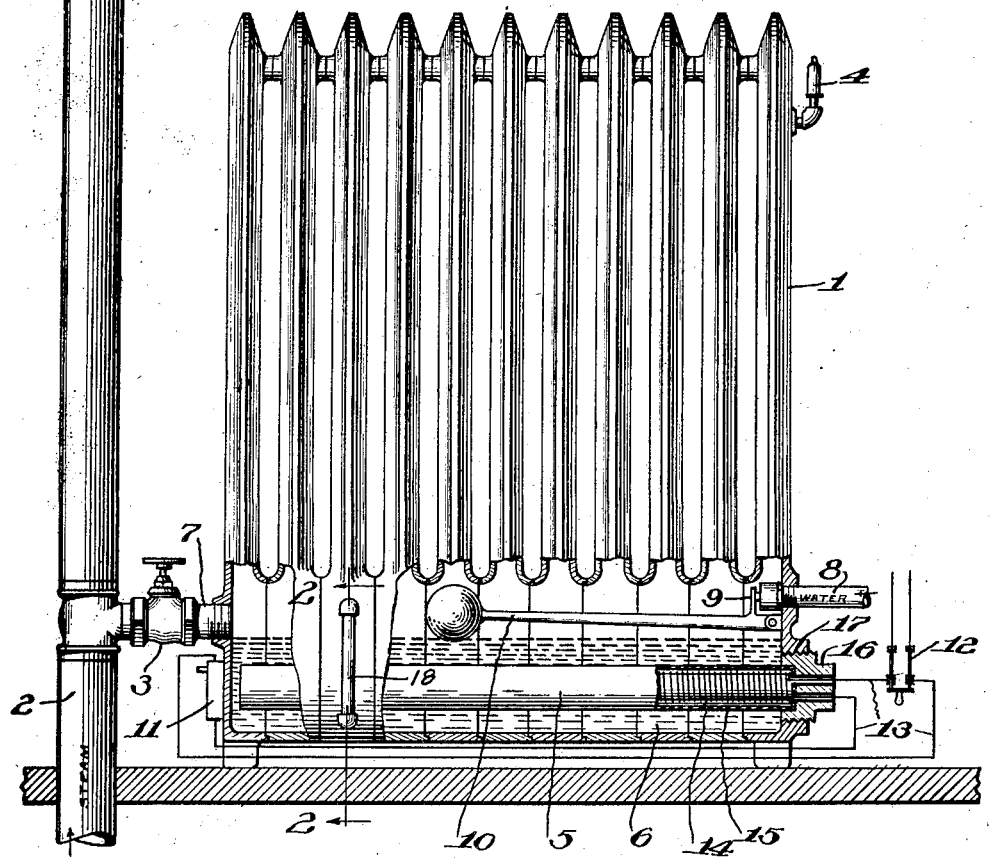
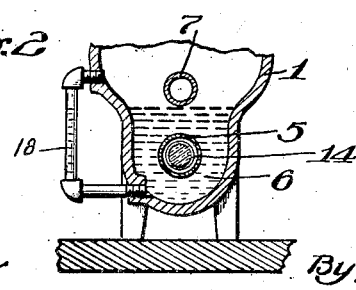
Inventor:
Fred M. Davis Patented Oct. 30, 1923.

1,472,052

UNITED STATES PATENT OFFICE.

FRED M. DAVIS, OF CHICAGO, ILLINOIS.

ELECTROSTEAM RADIATOR.

Application filed April 17, 1922. Serial No. 553,603.

*To all whom it may concern:*

Be it known that I, FRED M. DAVIS, a citizen of the United States of America, and a resident of Chicago, county of Cook, and State of Illinois, have invented a new and useful Improvement in Electrosteam Radiators, of which the following is a specification.

This invention relates to steam radiators and especially to quick acting devices of this character adapted for general use, and especially where the usual furnace supply or steam is irregular or undependable, or where heat is desired at times when the regular source of steam is out of service.

An illustrative embodiment of this invention is shown in the accompanying drawings, in which—

Figure 1 is mainly a side view of a steam radiator with part of the lower portion broken away to show the interior.

Figure 2 is a fragmentary vertical section on the line 2—2 of Figure 1.

Figures 3 and 4 show another embodiment of the invention.

In the construction shown in the drawings, the radiator 1 is similar in general external appearance to ordinary steam radiators, and is connected to a steam pipe 2 through a hand valve 3, as usual in steam heating systems, it being understood that the pipe 2 leads downward to a steam boiler (not shown). An air vent valve 4 is provided on the upper part of the radiator in the usual manner.

In order to provide for quick generation of steam independently of the source 2, an electric heater 5 is mounted in the lower part of the radiation, which is formed with a chamber 6 adapted to serve as a reservoir to hold a limited amount of water, wherein the unit 5 is immersed.

In order to assure a constant supply of water in the chamber 6, the steam inlet and return pipe 7 is positioned slightly above the horizontally disposed heater unit 5, as indicated by the water level shown in the drawing. An independent water inlet pipe 8 is provided for said chamber, which inlet is controlled by an automatic valve 9 actuated by the float 10.

In order to prevent possible overheating of the unit 5 in case of failure of the water supply, or if it is desired to limit the temperature of the radiator as a whole when electrically heated, a thermostat 11 is mounted on the exterior of the wall of said chamber. A manual switch 12 is also provided for throwing the electric heater in and out of service, said switch being connected by wiring 13 in series with the thermostat 11 and the heater unit 5.

In order that the unit 5 may be protected from injury by the water, the heater element 14 is enclosed in a thin tubular casing 15 of good heat conducting material, suitable insulation for the resistance wire being provided as understood in the art. One end of the unit as a whole is set in a threaded plug 16, fitting in the threaded aperture 17 at one end of said chamber. Said plug is removable for access to the interior of the chamber or for interchanging heater units as will be understood. In order that the action of the electric unit 5 may be quickly responsive for generating steam, the chamber 6 is formed to provide a thin wall of water about the unit 5, for which purpose the lower part of the chamber 6 may be comparatively narrow as shown in Figure 2, or the parts may be otherwise mutually formed to provide a small volume of water capable of quick heating and conversion into steam.

The operation of the device is as follows: The radiator is normally operated by steam from the pipe 2, subject to control by the valve 3. In case of failure or insufficient supply of steam from pipe 2, the switch 12 may be closed whereupon steam will be quickly generated in the chamber. In case the electric generator is operated for a considerable period of time resulting in gradual loss of the water in said chamber by escape either through the valve 4 or through valve 3, the float valve 9 responds to replenish the supply so as to maintain the water level somewhat above the unit 5. A water gage 18 is also provided.

Referring to the construction shown in Figures 3 and 4 the radiator frame 19 is provided with a narrow longitudinal reservoir 20 in the lower part. In this reservoir is mounted a longitudinally disposed tubular heating unit 21 supported substantially as shown in Figure 1 but with its inner end inclined upwardly somewhat so as to expose its upper surface to a considerable extent above the surface of the water. Said unit 21 is provided with a tubular sleeve 22 of wick-like character adapted to gradually feed a thin film of water over the exposed part of the heater whereby flash steam may be generated instantly. In this instance the float valve may be substantially similar to that shown in Figure 1 but the float 23 is disposed opposite the end of unit 21 which is somewhat shorter than shown in Figure 1 to accommodate said float. The float 23 is in the form of a hollow ball connected to the free end of the lever arm 24 as will be understood.

Some of the more obvious advantages and uses of this combination form of radiator are that in the case of apartment buildings where the boiler supply of steam is limited to certain cold periods of the year, the electric heater may be used to take the chill from the room when the weather is damp or chilly at any time during the year. Moreover, in many buildings it is customary to turn off the main supply of steam and bank the boilers early in the evening, as a result of which the house gets too cold to be comfortable late in the evening, whereupon with this device a room may be kept comfortable as long as may be desired or even all night, as, for instance, in case of sickness. Furthermore, it greatly facilitates comfort in the early morning in case one is obliged to rise before the customary hour of turning on the steam or firing the boilers.

It is apparent that this mode of supplementary heating is advantageous over ordinary gas heaters and such devices for the reason that it avoids throwing off noxious gases, but is nevertheless substantially instantaneous in operation, and is effective for heating purposes about as quickly as a gas heater or the regular source of steam.

Although but two slightly variant specific embodiments of the main features of this invention are herein shown and described, it will be understood that numerous details of the constructions shown may be altered or omitted without departing from the spirit of this invention as defined by the following claims.

I claim:

1. A steam radiator adapted for household use constructed and adapted to serve as a heating outlet for a separate common steam generator and also as a self contained generating and radiating unit, said radiator having an inlet to admit steam from the outside and also a source of heat therein to vaporize water in the lower part, and automatic means to control the said heat source and the supply of water to said radiator respectively.

2. A steam radiator connected and adapted to receive steam from an external source and having a water chamber directly therein, in combination with automatic float means to maintain a sufficient supply of water in said chamber, an electric heater in said chamber, and means to supply current thereto, said chamber having an overflow escape for surplus water and said heater being disposed below the level of said escape, 3. A steam radiator formed and adapted for use in connection with an external source of steam, substantially as usual for steam radiators, said radiator having a water reservoir and an electric heater adapted and arranged to supply steam in case of failure of the regular external source, said reservoir having walls formed to provide a thin layer of water surrounding said heater adapted for flash generation of steam.

4. A radiator having connections to receive steam from an external source and having a water reservoir therein provided with an electric flash steam generator and means to maintain a constant level of water in said reservoir.

Signed at Chicago this 15th day of April, 1922.

FRED M. DAVIS.